(12) United States Patent
Suh (10) Patent No.: US 9,874,875 B2
(45) Date of Patent: Jan. 23, 2018

(54) MOBILE ROBOT AND METHOD FOR DOCKING THE MOBILE ROBOT WITH CHARGING STATION

(71) Applicant: VARRAM SYSTEM CO., LTD., Daejeon (KR)

(72) Inventor: Byung Jo Suh, Incheon (KR)

(73) Assignee: VARRAM SYSTEM CO., LTD., Daejeon (KR)

( * ) Notice: Subject to any disclaimer, the term of this patent is extended or adjusted under 35 U.S.C. 154(b) by 235 days.

(21) Appl. No.: 14/897,645

(22) PCT Filed: Jul. 15, 2015

(86) PCT No.: PCT/KR2015/007362
§ 371 (c)(1),
(2) Date: Dec. 11, 2015

(87) PCT Pub. No.: WO2016/114463
PCT Pub. Date: Jul. 21, 2016

(65) Prior Publication Data
US 2016/0370804 A1    Dec. 22, 2016

(30) Foreign Application Priority Data

Jan. 14, 2015  (KR) .................. 10-2015-0006754
Apr. 30, 2015  (KR) .................. 10-2015-0061231

(51) Int. Cl.
*G05D 1/02* (2006.01)
*B25J 9/00* (2006.01)
(Continued)

(52) U.S. Cl.
CPC .............. *G05D 1/0225* (2013.01); *B25J 9/00* (2013.01); *B60L 11/1824* (2013.01);
(Continued)

(58) Field of Classification Search
CPC .............. G05D 1/0225; G05D 1/0231; G05D 2201/0203; A47L 2201/02; B60L 11/1824
(Continued)

(56) References Cited

U.S. PATENT DOCUMENTS 8,369,989 B2 *  2/2013  Sip ............................ B25J 5/00
                                                      320/109
8,680,816 B2 *  3/2014  Li .......................... A47L 9/2805
                                                      320/107
(Continued)

FOREIGN PATENT DOCUMENTS

JP       2008-102698 A    5/2008
KR  10-2004-0062040 A    7/2004
(Continued)

*Primary Examiner* — Timothy Waggoner
(74) *Attorney, Agent, or Firm* — Revolution IP, PLLC (57) ABSTRACT

The present invention relates to a mobile robot and a method for docking the mobile robot with a charging station.
The method for docking a mobile robot with a charging station according to the present invention includes a step of photographing peripheral images when the mobile robot receives a charging command signal from a user terminal; a step of determining whether the charging station is recognized or not based on the peripheral images; a step of generating a robot-driving command signal for determining whether the mobile robot should be moved or not and which direction the mobile robot should be moved depending on a result of the previous determination; a step of determining whether the mobile robot faces the front of the charging station or not when the mobile robot starts to move in accordance with the robot-driving command signal and then approaches the charging station; a step of generating a rotation command signal for rotating the charging station depending on a result of previous determination and transmitting the rotation command signal to the charging station; a step of docking the mobile robot with the charging station (Continued)

by driving the mobile robot when the charging station is rotated in accordance with the rotation command signal.

In this way, according to the present invention, a speedy and accurate docking becomes possible by rotating the charging station for the mobile robot to be accurately docked with the charging station.

12 Claims, 7 Drawing Sheets

(51) Int. Cl.
*H02J 7/00* (2006.01)
*B60L 11/18* (2006.01)

(52) U.S. Cl.
CPC .............. *G05D 1/0246* (2013.01); *H02J 7/00* (2013.01); *H02J 7/0047* (2013.01); *Y02T 10/7005* (2013.01); *Y10S 901/01* (2013.01)

(58) Field of Classification Search
USPC .......................................................... 320/107
See application file for complete search history.

(56) References Cited

U.S. PATENT DOCUMENTS

| 2005/0156562 A1* | 7/2005 | Cohen ................... A47L 9/2857 |
| | | 320/107 |
| 2014/0034086 A1 | 2/2014 | Chung et al. |
| 2016/0229060 A1* | 8/2016 | Kim ...................... G05D 1/0225 |

FOREIGN PATENT DOCUMENTS

| KR | 10-2007-0109592 A | 11/2007 |
| KR | 10-2011-0088136 A | 8/2011 |

* cited by examiner

MOBILE ROBOT AND METHOD FOR DOCKING THE MOBILE ROBOT WITH CHARGING STATION

TECHNICAL FIELD

The present invention relates to a mobile robot and a method for docking the mobile robot with a charging station. More particularly, the present invention relates a mobile robot and a method for docking the mobile robot with a charging station that may allow the mobile robot to be accurately docked with the charging station by rotating the charging station, enabling monitoring of all directions even during charging.

BACKGROUND ART

Recently, intelligent robotics has being mass produced new techniques day after day. Particularly, developments in a human-robot interaction field are remarkable.

A harmonious human-robot interaction is possible when a robot can perform a basic function that it finds and follows the human.

Robot services, such as recognizing and following the human or recognizing and chasing an invader are essential techniques for the human-robot interaction.

Various techniques capable of recognizing the human have been developed, but artificial intelligences of the conventional robots have a lot of restrictions in things that they can do for themselves like the human.

Accordingly, many recent robots perform operation depending on controls.

To solve these problems, techniques for controlling the robot using a user terminal such as a smart phone have been being proposed, but they have disadvantages that a smooth control is impossible since they are still at the level of controlling the robot only depending on images supplied from the robot.

In addition, they are inconvenient in that a user should directly supply the robot with a power to charge the robot and photographing may stop during a charge.

Korean Patent Laid-Open Publication No. 10-2011-0088136 published on Aug. 3, 2011 discloses a background technique of the present invention.

The above information disclosed in this Background section is only for enhancement of understanding of the background of the invention and therefore it may contain information that does not form the prior art that is already known in this country to a person of ordinary skill in the art.

DISCLOSURE

Technical Problem

The present invention has been made in an effort to provide a mobile robot and a method for docking the mobile robot with a charging station, which allow the mobile robot to be accurately docked with the charging station by rotating the charging station, enabling monitoring of all directions even during charging.

Technical Solution

An exemplary embodiment of the present invention provides a method for docking a mobile robot with a charging station including: a step of photographing peripheral images when the mobile robot receives a charging command signal from a user terminal; a step of determining whether the charging station is recognized or not based on the peripheral images; a step of generating a robot-driving command signal for determining whether the mobile robot should be moved or not and which direction the mobile robot should be moved depending on a result of the previous determination; a step of determining whether the mobile robot faces the front of the charging station or not when the mobile robot starts to move in accordance with the robot-driving command signal and then approaches the charging station; a step of generating a rotation command signal for rotating the charging station depending on a result of previous determination and transmitting the rotation command signal to the charging station; a step of docking the mobile robot with the charging station by driving the mobile robot when the charging station is rotated in accordance with the rotation command signal.

In addition, in the step of determining whether the charging station is recognized or not, the charging station may be regarded as having been recognized if a situation that LEDs provided at the charging station are irradiating is photographed after the charging station receives a signal for requesting an irradiation of the LEDs.

In addition, in the step of determining whether the charging station is recognized or not, a robot-driving command signal for rotating the mobile robot may be generated by regarding the charging station as not having been recognized if a situation that the LEDs provided at the charging station are irradiating is not photographed.

In addition, in the step of the determining whether the mobile robot faces the front of the charging station or not, the front of the charging station may be determined depending on colors of the LEDs provided at the charging station, speeds of flickering, intervals among the LEDs, and a shape that the LEDs are disposed.

In addition, in the step of the generating the rotation command signal for rotating the charging station and the transmitting the rotation command signal to the charging station, the rotation command signal for rotating the charging station may be generated so that the front of the mobile robot can face the front of the charging station with each other when the front of the mobile robot dose not face the front of the charging station, and transmitting the rotation command signal to the charging station.

In addition, the method for docking a mobile robot with a charging station may further comprise a step of rotating the charging station to monitor all directions when the mobile robot is docked with the charging station.

Another embodiment of the present invention provides a mobile robot including: an image-capturing unit which photographs peripheral images when receiving a charging command signal; a sensor which determines whether a charging station is recognized or not depending on the peripheral images; a controller which generates g a robot-driving command signal for determining whether the mobile robot should be moved or not and which direction the mobile robot should be moved depending on a result of the previous determination, and determines whether the mobile robot faces the front of the charging station or not when the mobile robot starts to move in accordance with the robot-driving command signal and then approaches the charging station; a communication unit which generates a rotation command signal for rotating the charging station depending on a result of previous determination, and transmits the rotation command signal to the charging station; and a driver which docks the mobile robot with the charging station by driving the mobile robot when the charging station is rotated in accordance with the rotation command signal.

Advantageous Effects

In this way, according to the exemplary embodiment of the present invention, the user can control the movements of the mobile robot using the user terminal, and a speedy and accurate docking becomes possible since the mobile robot photographs the plurality of LEDs provided at the charging station, moves toward the charging station, and rotates the charging station so that it can be docked with the charging station.

Also, the user can receive the real-time peripheral images photographed by the mobile robot capable of rotating in all directions since he can control the charging station using the user terminal while the mobile robot is charged.

BEST MODE

The present invention will be described more fully hereinafter with reference to the accompanying drawings, in which exemplary embodiments of the invention are shown.

As those skilled in the art would realize, the described embodiments may be modified in various different ways, all without departing from the spirit or scope of the present invention.

Accordingly, the drawings and description are to be regarded as illustrative in nature and not restrictive. Like reference numerals designate like elements throughout the specification.

In addition, unless explicitly described to the contrary, the word "comprise" and variations such as "comprises" or "comprising", will be understood to imply the inclusion of stated elements, but not the exclusion of any other elements.

The present invention will be described more fully hereinafter with reference to the accompanying drawings, in which exemplary embodiments of the invention are shown.

A mobile robot according to an exemplary embodiment of the present invention will now be described in detail with reference to FIG. 1 to FIG. 4.

Figure 1:
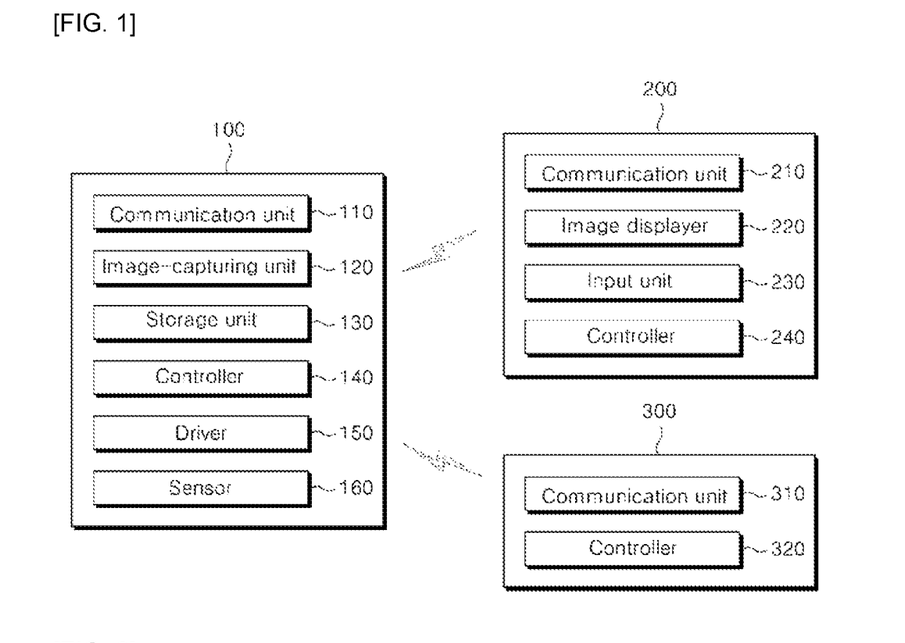
FIG. 1 is a block diagram for illustrating a control system of a mobile robot according to an exemplary embodiment of the present invention.
Figure 2:
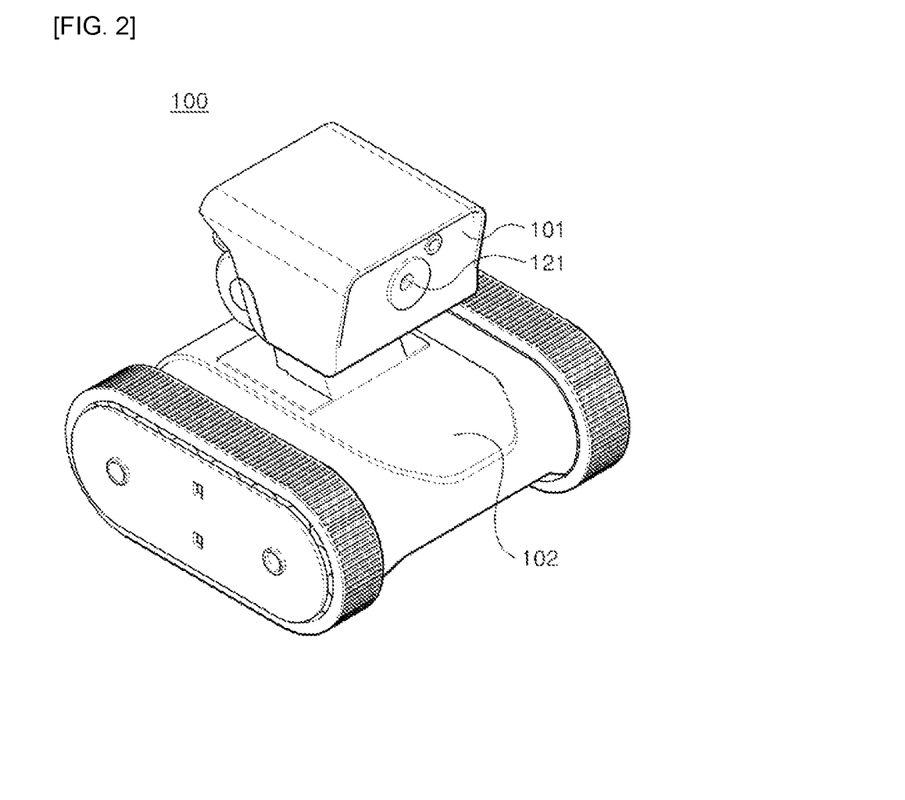
FIG. 2 is a diagram schematically illustrating the mobile robot according to the exemplary embodiment of the present invention.
Figure 3:
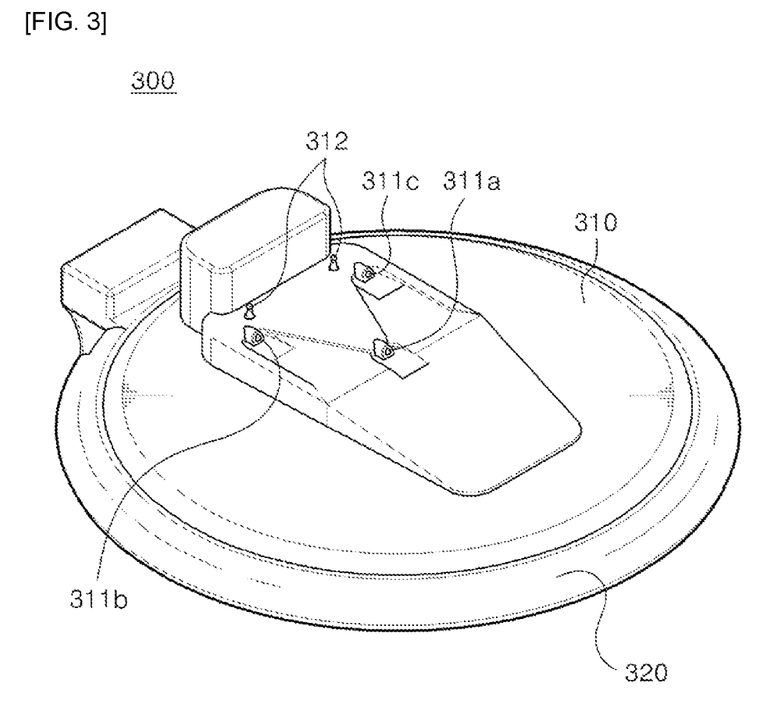
FIG. 3 and FIG. 4 are diagrams each illustrating a charging station and a lower plate of the charging station according to the exemplary embodiment of the present invention.
Figure 4:
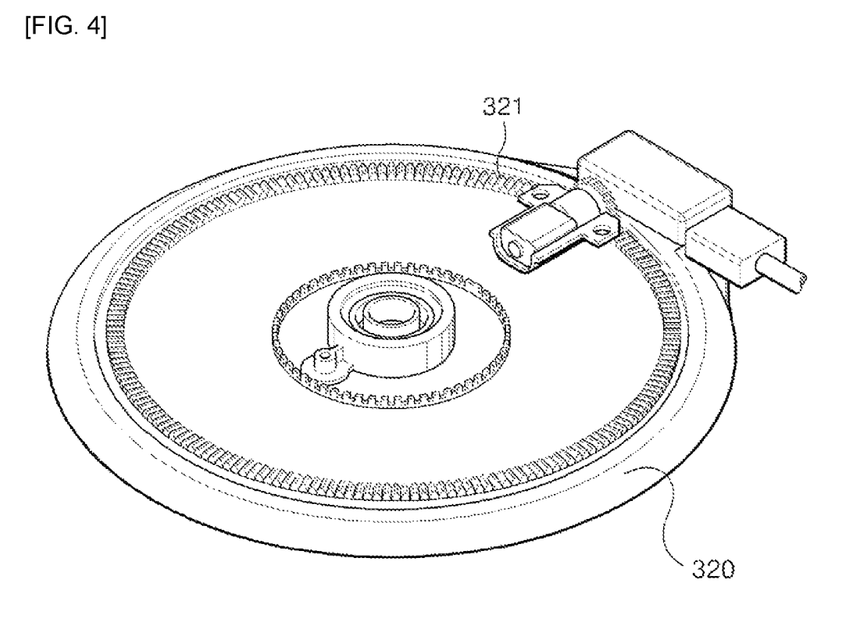

FIG. 1 is a block diagram for illustrating a control system of a mobile robot according to an exemplary embodiment of the present invention, FIG. 2 is a diagram schematically illustrating the mobile robot according to the exemplary embodiment of the present invention, and FIG. 3 and FIG. 4 are diagrams each illustrating a charging station and a lower plate of the charging station according to the exemplary embodiment of the present invention.

Referring to FIG. 1, the mobile robot 100 according to the exemplary embodiment of the present invention includes a communication unit 110, an image-capturing unit 120, a storage unit 130, a controller 140, a driver 150 and a sensor 160. A user terminal 200 includes a communication unit 210, an image displayer 220, an input unit 230 and a controller 240. A charging station 300 includes a communication unit 330 and a controller 340.

In this case, as shown in FIG. 2, the mobile robot 100 includes the image-capturing unit 120 provided at an upper portion 101 thereof to photograph the peripheral area, and a lower portion 102 of the mobile robot 100 is implemented by a moving means to move the mobile robot 100.

More specifically, the mobile robot 100 includes an actuator for a movement in all directions and a pan-tilt operation, and performs the movement in all directions depending on a control command which is transmitted from the user terminal 200.

The upper portion 101 and lower portion 102 of the mobile robot 100 are connected by a connecting means that facilitates the pan-tilt operation, and the upper portion 101 is configured to be capable of moving up and down for the pan-tilt operation.

For stable driving, the lower portion 102 of the mobile robot 100 is implemented by a plurality of wheels or in a way that the plurality of wheels are covered with a caterpillar.

The mobile robot 100 communicates with the user terminal 200 and the charging station 300 to transmit and receive data signals, recognizes the charging station 300 by detecting it in peripheral images photographed by the image-capturing unit 120, docks with the recognized charging station 300, and may also transmit control signals to the charging station 300.

When the user terminal 200 is in an interior space adjacent to the mobile robot 100, the mobile robot 100 may perform a Wi-Fi communication with the user terminal 200. Meanwhile, when the user terminal 200 is out of the building, it may perform the Wi-Fi communication with the user terminal 200 through a peripheral access point (AP not shown) to transmit and receive a data signal.

The user terminal 200 transmits and receives the data signal to and from the mobile robot 100, and supplies the peripheral images transmitted from the mobile robot 100 to the user.

In addition, it may generate a control signal in accordance with the peripheral images or a signal in accordance with a control command transmitted from the user, and may transmit it to the mobile robot 100.

The user terminal 200 includes a program, such as an application (App) to control the mobile robot 100, receives the peripheral images from the mobile robot 100, supplies them to the user, and controls the mobile robot 100 depending on the control signal which is transmitted from the user.

Accordingly, the user terminal 200 controls movement of the mobile robot 100 depending on a user's control and may be implemented by a terminal capable of displaying the peripheral images which are photographed by the mobile robot 100.

Also, the user terminal 200 is implemented by a portable terminal having an operating system, such as a personal computer (PC), a notebook computer, and a smart phone.

The peripheral AP is positioned at the same place with the mobile robot 100 or in the vicinity of the mobile robot 100 and may function as a relay which transmits and receives the data between the mobile robot 100 and the user terminal 200. That is, it is implemented by a sharer or a repearter module for performing a WiFi connection between the mobile robot 100 and the user terminal 200.

Hereinafter, the mobile robot using the user terminal according to the exemplary embodiment of the present invention will be described in more detail.

The communication unit 110 includes a communication means for transmitting and receiving the data signal to and from the user terminal 200, receives the control signal from the user terminal 200 and transmits it to the controller 140. It also transmits the peripheral images transmitted from the image-capturing unit 120 to the user terminal 200 in real time.

Particularly, the communication unit 110 includes the access point (AP) capable of performing Wi-Fi communication and may directly communicate with the user terminal 200 and the charging station 300 through WiFi or web, or it may communicate with them through WiFi and the peripheral AP.

That is, the communication unit 110 includes a Duplex Radio Camera WiFi (DRC-WiFi) communication module, transmits the peripheral images photographed by the image-capturing unit 120 to the user terminal 200, and supplies the control signals which are transmitted from the user terminal 200, to the controller 140.

In this case, the communication unit 110 according to the exemplary embodiment of the present invention performs data-communication with the user terminal 200 using a wireless communication based on an internet protocol (IP) and may transmit the control signal to peripheral electric devices through a local communication, such as BlueTooth, Zigbee, and infrared rays (IR) in order to control them.

Accordingly, even if the user is outdoors, he can control operations of the peripheral electric devices of the mobile robot 100 which participate in a home network system using the user terminal 200.

In addition, the communication unit 110 may transmit and receive the data signal to and from a wireless station through a local communication.

The image-capturing unit 120 includes an image-capturing means 121 for photographing the peripheral images. It receives the peripheral images from the image-capturing means 121 and supplies the received images to the user terminal 200 through the communication unit 110.

In this case, the image-capturing means 121 includes a means capable of photographing the peripheral images, such as a camera. The image-capturing unit 120 formats the peripheral images photographed by the image-capturing means 121 using image formats, such as JPEG (Joint Photographic Experts Group), VGA (Video Graphics Array), MPEG (Motion Picture Experts Groups), MOV, AVI (Audio Video Interleave), etc. and supplies the formatted peripheral images to the user terminal 200.

The storage unit 130 stores the photographed peripheral images in real-time by the image-capturing unit 120.

In this case, the storage unit 130 may store only newly updated ten-minute images to reduce storage capacity.

The sensor 160 determines whether the charging station 300 is recognized or not based on the peripheral images photographed by the image-capturing unit 120.

The controller 140 receives the control signal from the user terminal 200, generates a robot-driving command signal to control movement of the mobile robot 100 depending on the received control signal, and then supplies it to the driver 150.

In addition, when a charge button 231 is input by the user terminal 200, the controller 140 receives a charge command signal from the user terminal 200 and controls movement of the mobile robot 100 to be docked with the charging station 300 depending on whether the charging station 300 has been recognized by the sensor 160.

In detail, when the charge button 231 is input by the user terminal 200, the controller 140 receives the charge command signal from the user terminal 200, transmits a signal for demanding radiation of LEDs to the charging station 300 through the sensor 160, regards the charging station 300 as having been recognized when the image-capturing unit 120 photographs a situation that the LEDs 311 are irradiating, and then generates the robot-driving command signal for the mobile robot 100 to move toward the charging station 300.

In case when the charging station 300 has been not recognized by the image-capturing unit 120, the controller 140 generates the robot-driving command signal for rotating the mobile robot 100 at 360 degrees.

In addition, the image-capturing unit 120 supplies the peripheral images to the user terminal 200 in real-time by photographing the peripheral images even while the mobile robot 100 is rotating. The controller 140 stops a rotational movement of the mobile robot 100 when recognizing the charging station 300 during rotating, and generates the robot-driving command signal for moving the mobile robot 100 toward the charging station 300.

In this case, if the charging station 300 is not recognized in spite of the rotational movement of the mobile robot 100, a charging error may be displayed in the image displayer 220 of the user terminal 200.

Also, when the mobile robot 100 approaches the charging station 300 in accordance with the robot-driving command signal, the controller 140 determines whether the mobile robot 100 faces the front of the charging station 300 and then generates the robot-driving command signal for the mobile robot 100 to be docked with the charging station 300.

Specifically, the controller 140 determines the front of the charging station 300 based on colors of a plural of LEDs 311, speeds of flickering, intervals among the LEDs 311 and a shape in which the plurality of LEDs 311 are disposed.

In this case, the charging station 300 is a device for supplying a power to the mobile robot 100, and it may supply the power to the mobile robot 100 in a state that the mobile robot 100 is docked with two charging terminals 312 positioned on both sides of an upper side plate 310 as shown in FIG. 3, or in a wireless charging way without the charging terminals 312.

The plurality of LEDs 311a, 311b and 311c may be disposed, forming in a shape among a triangle, a polygon and a line. Particularly, the LED 311a is disposed at a dead center of the charging station 300 and the LEDs 311b and 311c are each disposed at the same angle and same interval from the LED 311a.

In this case, the plurality of LEDs 311a, 311b, and 311c may be provided to emit different colors from each other or to flicker in different speeds.

In addition, the LEDs 311 are illustrated as a means for recognizing the position of the charging station 300 in the exemplary embodiment of the present invention, but it is not limited thereto and may be replaced with various light emitting elements, such as a light emitting diode and an infrared sensor.

Accordingly, when the mobile robot 100 moves toward the charging station 300 and approaches it, the controller 140 recognizes the front of the charging station 300 via the LED 311 provided at the charging station 300, but in further detail it regards the mobile robot 100 as having been positioned in the front of the charging station 300 when an interval between the LED 311a and 311b is same with that between the LED 311a and 311c.

In case when the mobile robot 100 dose not face the front of the charging station 300, the controller 140 may generate a rotation command signal for rotating the charging station 300 so that the front of the charging station 300 can face the front of the mobile robot 100, and then transmit the rotation command signal to the charging station 300.

Accordingly, when the communication unit 330 of the charging station 300 receives the rotation command signal from the controller 140 of the mobile robot 100, the controller 340 of the charging station 300 controls a bevel gear 321 provided at the lower plate 320 of the charging station 300 for the charging station 300 to be rotated.

Specifically, the inner side of the lower plate 320 of the charging station 300 is implemented by the bevel gear 321 as shown in FIG. 4 so that the upper plate 310 can be rotated.

Thus, the mobile robot 100 docked with the charging station 300 can be rotated at 360 degrees by the bevel gear 321.

The driver 150 moves the mobile robot 100 up and down and in all directions in accordance with the robot-driving command signal transmitted from the controller 140.

In the user terminal 200, the communication unit 210 transmits and receives the data to and from the mobile robot 100 via WiFi or web, or transmits and receives the data signal to and from the mobile robot 100 via the peripheral AP or WiFi. Specifically, the communication unit 210 receives the peripheral images from the mobile robot 100, transmits them to the image displayer 220 and transmits a robot-driving signal a control signal which is transmitted from the controller 240, to the mobile robot 100.

The image displayer 220 supplies the peripheral images transmitted through the communication unit 210 to the user in real-time.

The input unit 230 receives the robot-driving signal for moving the mobile robot 100 and the control signal for controlling movements of the mobile robot 100, such as the charging command signal, from the user.

That is, the user inputs the robot-driving signal that allows the mobile robot 100 to move forward and backward and to turn left and right and the control signal such as the charging command signal.

This input unit 230 may be implemented by a touch panel capable of input and output and may receive input signals through various kinds of buttons including a charging button from the user, simultaneously supplied with the peripheral images.

The controller 240 controls the communication unit 210, the image displayer 220 and the input unit 230, and also controls a data flow of each unit 210, 220 or 230.

The user terminal 200 in accordance with the exemplary embodiment of the present invention may be connected with the mobile robot 100 via WiFi or web and control movements of the mobile robot 100.

A method for docking the mobile robot with the charging station using the user terminal according to the exemplary embodiment of the present invention will now be described in detail.

Figure 5:
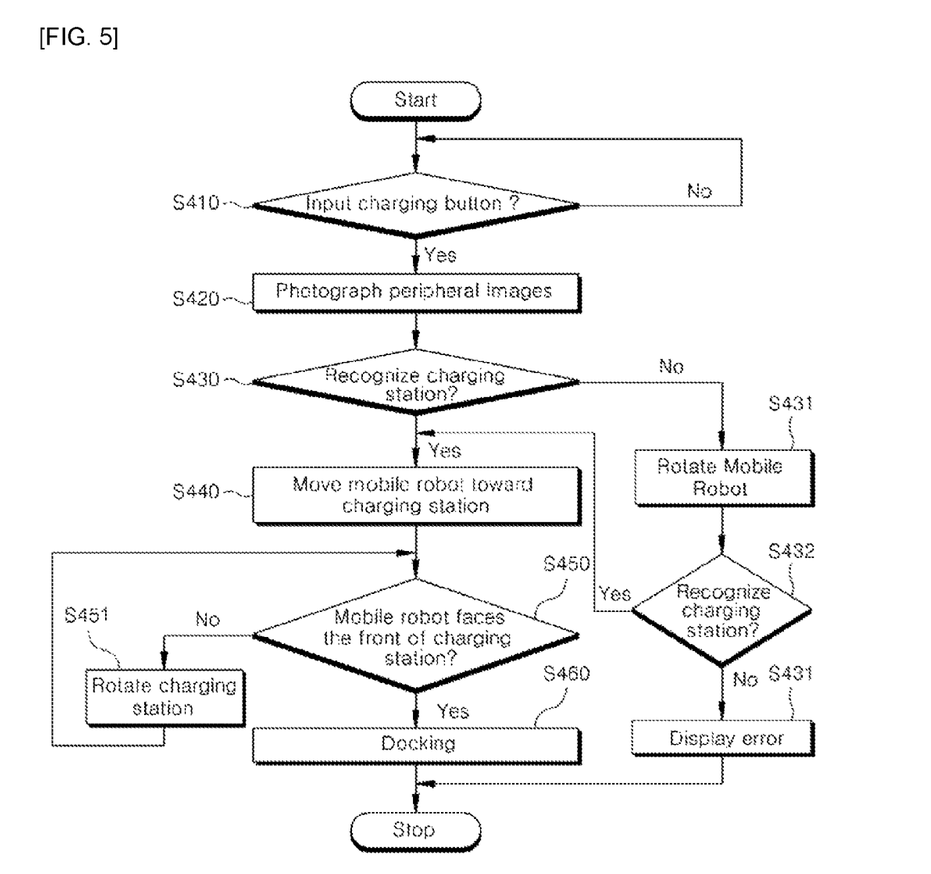
FIG. 5 is a flowchart sequentially illustrating a process of docking the mobile robot with the charging station.
Figure 6:
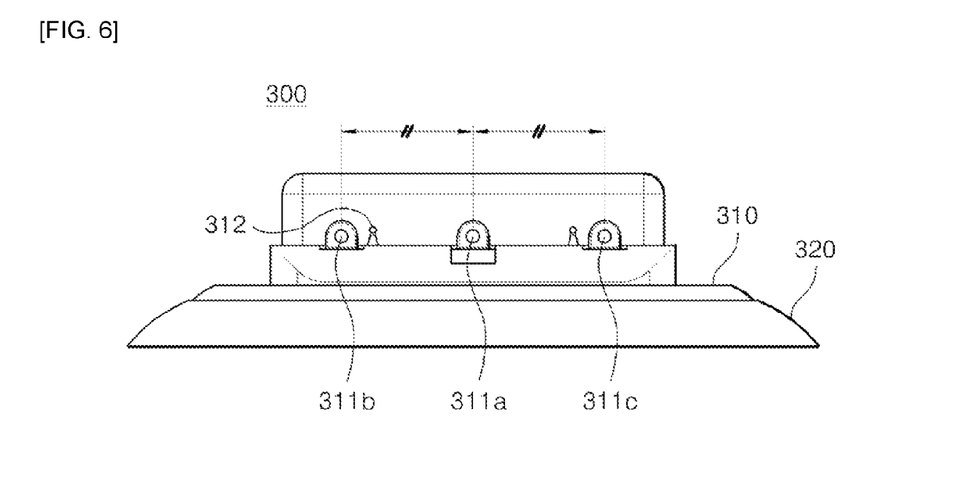
FIG. 6 is a diagram illustrating how the mobile robot recognizes the front of the charging station according to the exemplary embodiment of the present invention
Figure 7:
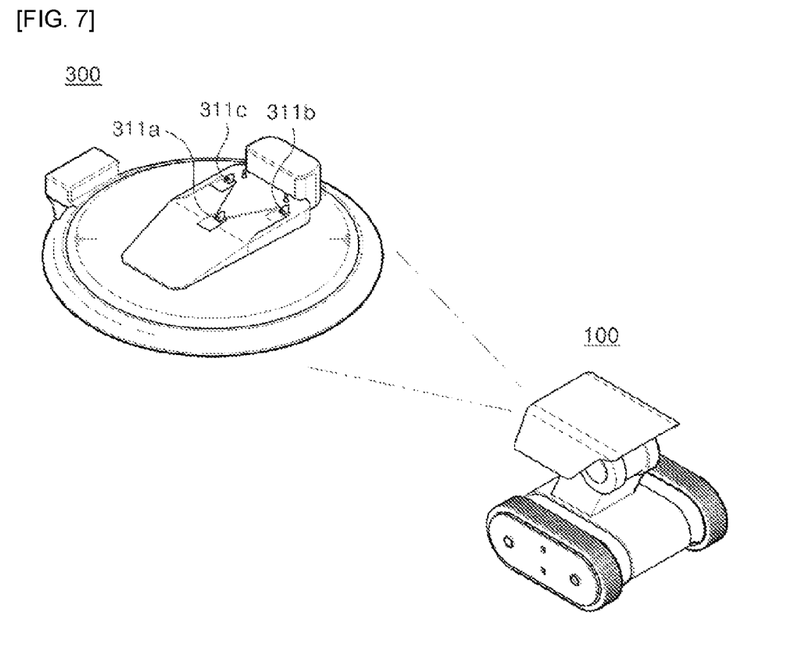
FIG. 7 to FIG. 9 are diagrams illustrating processes that the mobile robot station recognizes the charging station according to the exemplary embodiment of the present invention.
Figure 8:
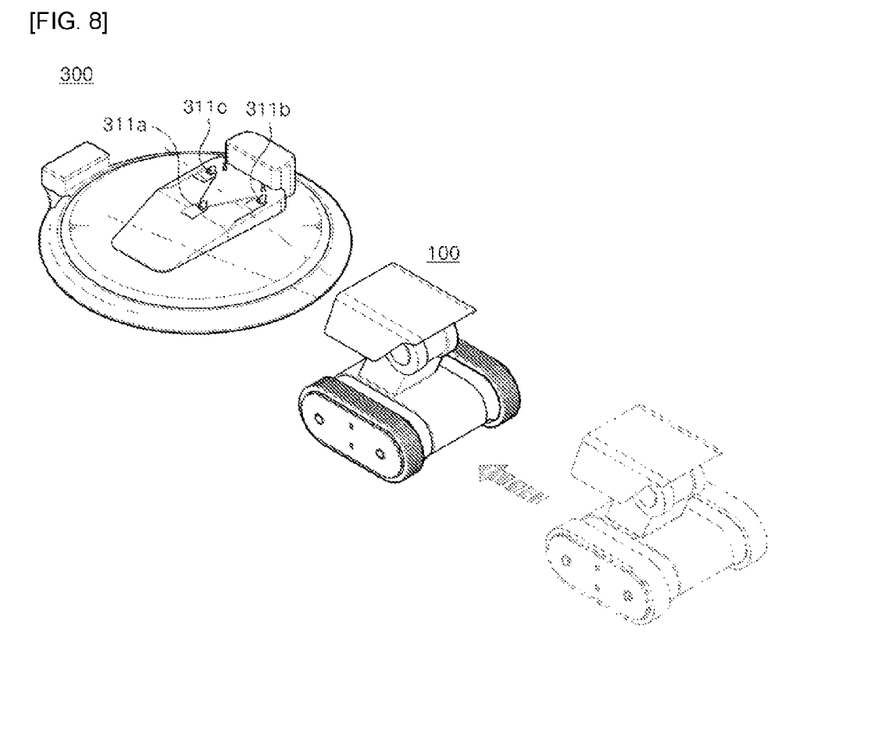
Figure 9:
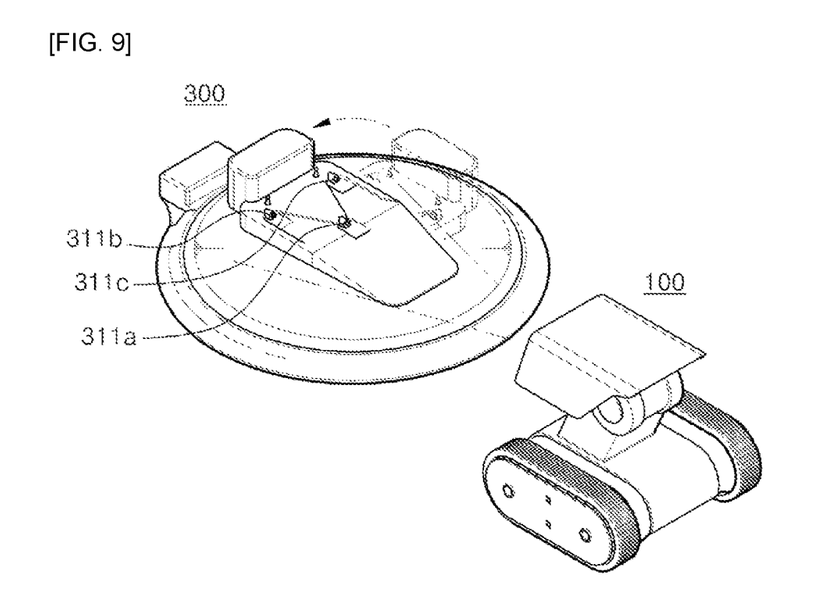
Figure 10:
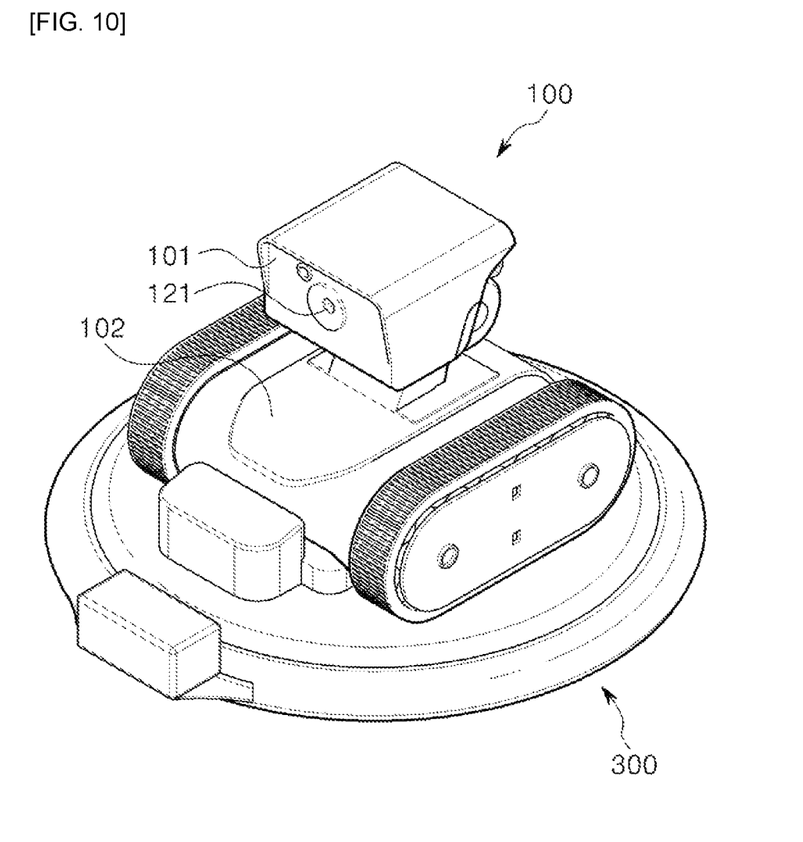
FIG. 10 and FIG. 11 are diagrams illustrating that the mobile robot can rotate in all directions even in a state of being docked with the charging station according to the exemplary embodiment of the present invention.
Figure 11:
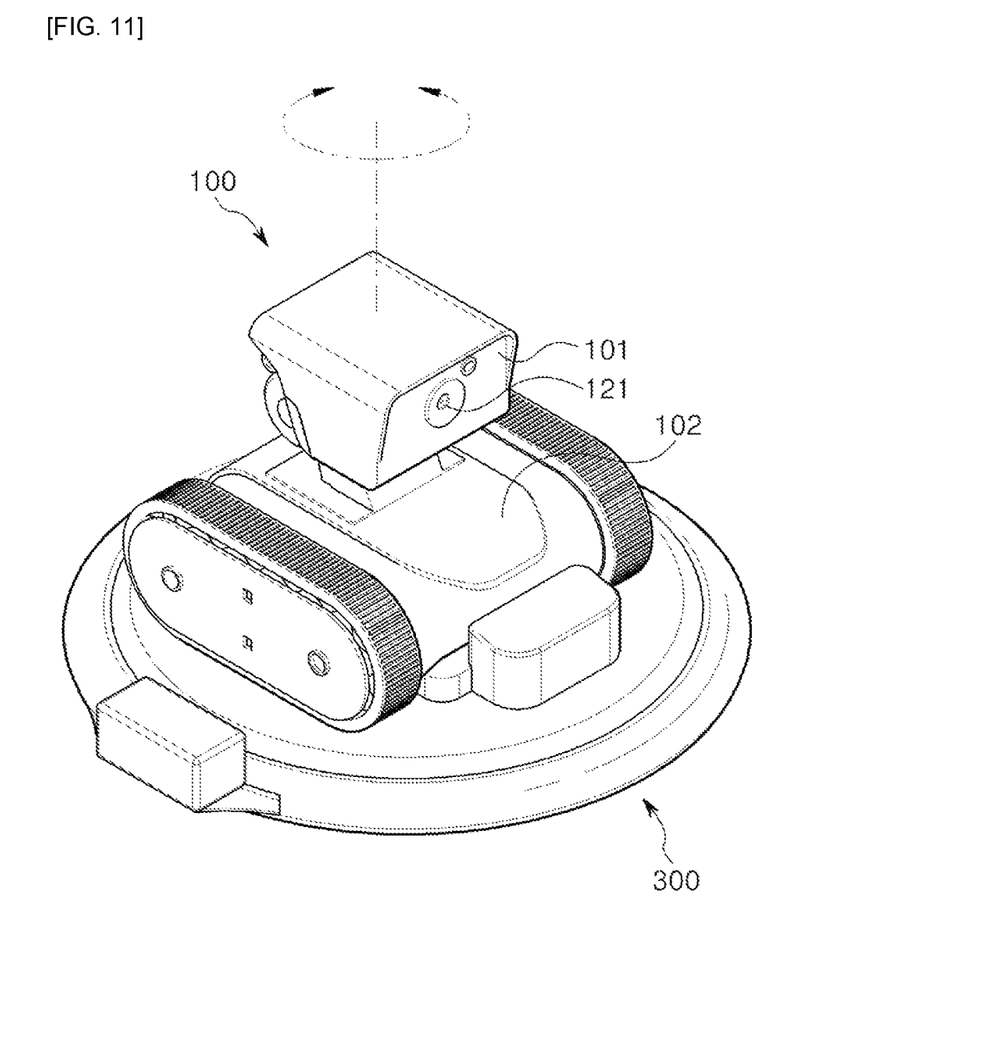

FIG. 5 is a flowchart sequentially illustrating a process of docking the mobile robot with the charging station, FIG. 6 is a diagram illustrating how the mobile robot recognizes the front of the charging station according to an exemplary embodiment of the present invention, FIG. 7 to FIG. 9 are diagrams illustrating processes that the mobile robot recognizes the charging station according to the exemplary embodiment of the present invention, and FIG. 10 and FIG. 11 are diagrams illustrating that the mobile robot can rotate in all directions even in a state of being docked with the charging station according to the exemplary embodiment of the present invention.

In a docking method of the mobile robot and the charging station in accordance with the exemplary embodiment of the present invention, when the charging button 231 of the user terminal 200 is inputted by the user, the controller 140 receives the charging command signal at step S410 and then the image-capturing unit 120 photographs the peripheral images at step S420.

Then, the sensor 160 determines whether the charging station 300 has been recognized or not with reference to the photographed peripheral images at step S430.

In this case, the user may directly move the mobile robot 100 toward a vicinity of the charging station 300 using an operation button provided in the input unit 230 of the user terminal 200.

In the next step S440, the controller 140 generates the robot-driving command signal for determining whether to move the mobile robot 100 and a direction of moving, based on a determined result at the step S430.

Specifically, if a situation that the LEDs 311 of the charging station 300 are irradiating is photographed after the charging station 300 receives a signal for requesting irradiation of the LEDs 311, the controller 140 regards the charging station 300 as having been recognized and generates the robot-driving command signal to move the mobile robot 100 toward the charging station 300.

However, if a situation that the LEDs 311 are irradiating is not photographed, the controller 140 regards the charging station 300 as not having been recognized and may generates the robot-driving command signal to rotate the mobile robot at 360 degrees at step 431.

In this case, if the charging station 300 is recognized through the peripheral images at step S432 while the mobile robot 100 moves rotatively in accordance with the robot-driving command signal generated at the step S431, the controller 140 returns to step S440 so as to generate the robot-driving command signal for moving the mobile robot 100 toward the charging station 300.

If the charging station 300 is not recognized, the image displayer 220 of the user terminal 200 displays a charging error at step S433.

Next, when the mobile robot 100 approaches the charging station 300 in accordance with the robot-driving command signal generated at step S440, it is determined that the mobile robot 100 faces the front of the charging station 300 at step S450.

In this case, the charging station 300 is a device for supplying a power to the mobile robot 100, and it may supply the power to the mobile robot 100 in a state that the mobile robot 100 is docked with two charging terminals 312 provided on both sides of the upper plate 310, or in a wireless charging way without the charging terminals 312.

The plurality of LEDs 311a, 311b and 311c may be disposed forming a shape among a triangle, a polygon and a line. Particularly, the LED 311a is disposed at a dead center of the charging station 300 and the LEDs 311b and 311c are each disposed at the same angle and same interval from the LED 311a.

In this case, the plurality of LEDs 311a, 311b, and 311c may emit different colors from each other or flicker in different speeds.

In addition, the LED 311 is illustrated as a means for recognizing a position of the charging station 300 in the exemplary embodiment of the present invention, but it is not limited thereto and may be replaced with various light emitting elements, such as a light emitting diode and an infrared sensor.

Accordingly, if the charging station 300 is recognized through the image-capturing unit 120, the controller 140 of the mobile robot 100 recognizes the front of the charging station 300 through the LED 311. In detail, the controller 140 regards the mobile robot 100 as having been positioned in the front of the charging station 300 when an interval between the LED 311a and 311b is same with that between the LED 311a and 311c as shown in FIG. 6.

If the mobile robot 100 dose not face the front of the charging station 300, the controller 140 generates the rotation command signal for rotating the charging station 300 so that the front of the charging station 300 can face the front of the mobile robot 100, and then transmits it to the charging station 300 at step S451.

Accordingly, when the communication unit 330 of the charging station 300 receives the rotation command signal from the controller 140 of the mobile robot 100, the controller 340 of the charging station 300 controls the bevel gear 321 provided at the lower plate 320 of the charging station 300 for the charging station 300 to be rotated. The controller 340 returns to step S450 in order to determine whether the position of the mobile robot 100 is in the front of the charging station 300 or not.

If the position of the mobile robot 100 is determined to be in the front of the charging station 300 at step 450, the controller 140 generates the robot-driving command signal for docking the mobile robot 100 with the charging station 300 and docks mobile robot 100 with the charging station 300 at step S460.

That is, as shown in FIG. 7, the mobile robot 100 recognizes the position of the charging station 300 through the image-capturing unit 120 and the detector 160 when receiving the charging command signal from the user terminal 200, and then moves toward the charging station 300 as shown in FIG. 8. In this case, if the mobile robot 100 is not positioned in the front of the charging station 300, the charging station 300 is rotated so that its front side can be faced toward the mobile robot 100 as shown on FIG. 9.

In addition, if the user transmits the rotation command signal to the mobile robot 100 using the user terminal 200 in a state that the mobile robot 100 is docked with the charging station 300 as shown in FIG. 10, the mobile robot 100 may transmit a local signal, such as an infrared signal, to the charging station 300 in order to rotate the upper plate 310 of the charging station 300.

When the charging station 300 drives the bevel gear 321 to rotate the upper plate 310 at 180 degrees by the bevel gear 321, the mobile robot 100 is turned in the front direction as shown in FIG. 11.

Since the charging station 300 is generally installed to face a wall, the wall is apt to be photographed when the mobile robot 100 is docked with the charging station 300, as shown in FIG. 10.

In this case, the charging station 300 rotates the mobile robot 100 to monitor all directions as shown in FIG. 11 and thus continuous photographing becomes possible.

In this way, according to the exemplary embodiment of the present invention, the user can control the movements of the mobile robot using the user terminal, and a speedy. Also, the mobile robot photographs the plurality of LEDs provided at the charging station when the charging button is inputted by the user, determines whether to be in the front of the charging station, and then moves toward it, whereby accurate docking becomes possible.

In addition, the user can receive the real-time peripheral images photographed by the mobile robot capable of rotating in all directions since he can control the charging station using the user terminal while the mobile robot is charged.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

Accordingly, an actual technical protection scope of the present invention is to be defined by the claims.

The invention claimed is:

1. A method for docking a mobile robot with a charging station, comprising:
    photographing peripheral images when the mobile robot receives a charging command signal from a user terminal;
    determining whether the charging station is recognized or not based on the peripheral images;
    generating a robot-driving command signal for determining whether the mobile robot should be moved or not and which direction the mobile robot should be moved depending on a result of the previous determination;
    determining whether the mobile robot faces the front of the charging station or not when the mobile robot starts to move in accordance with the robot-driving command signal and then approaches the charging station;
    generating a rotation command signal for rotating the charging station depending on a result of previous determination and transmitting the rotation command signal to the charging station; and
    docking the mobile robot with the charging station by driving the mobile robot when the charging station is rotated in accordance with the rotation command signal.

2. The method of claim 1, wherein the determining whether the charging station is recognized or not includes regarding the charging station as having been recognized if a situation that LEDs provided at the charging station are irradiating is photographed after the charging station receives a signal for requesting an irradiation of the LEDs.

3. The method of claim 2, wherein the determining whether the charging station is recognized includes generating a robot-driving command signal for rotating the mobile robot by regarding the charging station as not having been recognized if a situation that the LEDs provided at the charging station are irradiating is not photographed.

4. The method of claim 1, wherein the determining whether the mobile robot faces the front of the charging station or not includes determining the front of the charging station based on colors of the LEDs provided at the charging station, speeds of flickering, intervals among the LEDs, and a shape that the LEDs are disposed.

5. The method of claim 1, wherein the generating the rotation command signal for rotating the charging station and the transmitting the rotation command signal to the charging station includes generating the rotation command signal for rotating the charging station so that the front of the mobile robot can face the front of the charging station with each other when the front of the mobile robot dose not face the front of the charging station, and transmitting the rotation command signal to the charging station.

6. The method of claim 1, further comprising rotating the charging station to monitor all directions when the mobile robot is docked with the charging station.

7. A mobile robot comprising:
 an image-capturing unit which photographs peripheral images when receiving a charging command signal;
 a sensor which determines whether a charging station is recognized or not depending on the peripheral images;
 a controller which generates g a robot-driving command signal for determining whether the mobile robot should be moved or not and which direction the mobile robot should be moved depending on a result of the previous determination, and determines whether the mobile robot faces the front of the charging station or not when the mobile robot starts to move in accordance with the robot-driving command signal and then approaches the charging station;
 a communication unit which generates a rotation command signal for rotating the charging station depending on a result of previous determination, and transmits the rotation command signal to the charging station; and
 a driver which docks the mobile robot with the charging station by driving the mobile robot when the charging station is rotated in accordance with the rotation command signal.

8. The mobile robot of claim 7, wherein the sensor regards the charging station as having been recognized if a situation that LEDs provided at the charging station are irradiating is photographed after the charging station receives a signal for requesting an irradiation of the LEDs.

9. The mobile robot of claim 8, wherein the sensor regards the charging station as not having been recognized if a situation that the LEDs provided at the charging station are irradiating is not photographed and the controller generates the robot-driving command signal for rotating the mobile robot when the charging station is regarded as not having been recognized.

10. The mobile robot of claim 7, wherein the controller determines the front of the charging station based on colors of the LEDs provided at the charging station, speeds of flickering, intervals among the LEDs, and a shape that the LEDs are disposed.

11. The mobile robot of claim 7, wherein the controller generates the rotation command signal for rotating the charging station so that the front of the mobile robot can face the front of the charging station with each other when the front of the mobile robot dose not face the front of the charging station, and transmitting the rotation command signal to the charging station.

12. The mobile robot of claim 7, wherein the controller rotates the charging station to monitor all directions when the mobile robot is docked with the charging station.

* * * * *